United States Patent Office 3,282,969
Patented Nov. 1, 1966

3,282,969
7,7-GEM-DIFLUORO STEROIDS OF THE ANDRO-STANE AND PREGNANE SERIES
George A. Boswell, Jr., Wilmington, Del., assignor to E. I. du Pont de Nemours and Company, Wilmington, Del., a corporation of Delaware
No Drawing. Filed July 2, 1964, Ser. No. 380,067
6 Claims. (Cl. 260—397.3)

This invention relates to new fluoro steroids and to a method for preparing these compounds. More specifically, it concerns new 7,7-gem-difluoro steroids and their preparation.

Since the discovery by Fried and Sabo [J. Am. Chem. Soc., 75, 2273 (1953); 76, 1455 (1954)] that the introduction of a fluorine atom at the 9-position into cortisol resulted in enhanced biological activity, an ever-increasing amount of research has been directed toward synthesizing new types of fluorine-containing steroids and finding new ways of introducing fluorine into the steroid nucleus [see, for example, Bowers et al., J. Am. Chem. Soc., 84, 1050 (1962); and Fieser and Fieser, "Steroids," Reinhold Publishing Corp., 1959, especially at pp. 682–699 for fluorocorticoids and pp. 592–597 for fluorosteroids].

The intensive work in the field is due to the advantages which frequently accrue from the presence of fluorine in steroidal drugs, these advantages including increased potency, decreased toxicity and greater efficacy (for instance, high anti-inflammatory activity).

The new products of this invention are the 7,7-gem-difluoro steroids of the formula

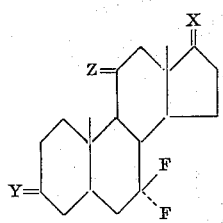

where X is one of the groups

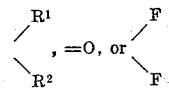

$R^1$ being H, OH or OAcyl and $R^2$ being H, C≡CH, CH=$CH_2$, $CF_2CH_3$, $COCH_3$, $COCH_2OH$, $COCH_2OAcyl$, $CH(CH_3)OH$, or $CH(CH_3)OAcyl$; Y is one of the groups

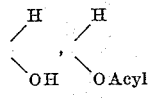

and =O; Z is one of the groups

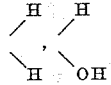

or =O; and the bonds between carbons 1 and 2 and 4 and 5 are single or double bonds.

In the above definition, "Acyl" in each instance is a hydrocarbon carboxylic acyl radical having from one to ten carbon atoms. Representative of such acyl radicals are the lower alkanoyl radicals, e.g., formyl, acetyl, propionyl, isobutyryl, hexanoyl, octanoyl, decanoyl, and the like; cycloalkyl-lower-alkanoyl radicals, e.g., cyclopentylacetyl, β-cyclohexylpropionyl, and the like; aroyl and alkaroyl radicals, e.g., benzoyl-p-toluyl, and the like; and aralkanoyl radicals, e.g., phenylacetyl, β-phenylpropionyl, and the like.

Compounds of this invention are prepared by reacting a 7-keto steroid with sulfur tetrafluoride, whereby the 7-oxo substituent is replaced by two fluorine atoms.

In this reaction, if other keto groups are present, sulfur tetrafluoride may also react with them to a greater or lesser extent, depending on their location and reactivity. Some keto groups, such as conjugated 3-keto and especially 11-ketone, will remain substantially unaffected. Others, such as 17-keto and 20-keto, may be converted at least in part to difluoro substituents, as will be shown in some of the following examples, and the non-conjugated 3-keto group, if present as such, will also be replaced. However, when such a replacement is not desired, the keto group can be first protected by suitable means, for example by conversion to a ketal, from which it can be subsequently regenerated. Alternatively, the starting 7-keto steroid is selected so as to contain no other reactive keto groups but only substituents, such as hydroxyl or acyloxy, which remains substantially unaffected by sulfur tetrafluoride under the operating conditions, and which can later be converted to keto groups by known procedures, if desired.

From the 7,7-difluoro steroids obtained in the reaction discussed above, others falling within the scope of the invention but having different X, Y and Z groups and/or unsaturation in the A ring can be prepared by methods known to workers in the steroid field, including for example hydrolysis, esterification, oxidation, reduction, amination, dehydrogenation, ethynylation, vinylation, and the like. Many of these methods will be illustrated in the examples that follow.

The 7-keto steroids of the above structure, which serve as the starting materials, can be prepared by methods known in the art. Specific examples of such preparations will also be described later on.

In the reaction with the 7-keto steroid, the sulfur tetrafluoride is employed in a mole ratio $SF_4$/steroid of at least 1:1. Preferably, the sulfur tetrafluoride is used in excess, which can be quite large, e.g., up to 100 moles per mole or higher. The reaction is conducted in an inert organic liquid medium which is at least a partial solvent for the reactants and preferably boils below about 100° C. Suitable solvents include the hydrocarbons such as n-hexane, cyclohexane or benzene and the halohydrocarbons such as methylene chloride, chloroform, carbon tetrachloride, tetrachloroethylene, sym.-tetrachlorodifluoroethane, perfluorodimethylcyclohexane, etc. The reaction can proceed at temperatures as low as 0° C. or lower. It is preferred not to exceed a temperature of about 100° C. to avoid possible side reactions, and a preferred temperature range is that between 15 and 75° C. The reaction is conducted in sealed vessels, in view of the volatility of sulfur tetrafluoride. A catalyst is not essential but the reaction proceeds much faster in the presence of catalysts known to influence fluorinations of this type, such as boron trifluoride, arsenic trifluoride, phosphorous pentafluoride, titanium tetrafluoride or hydrogen fluoride. Hydrogen fluoride is the preferred catalyst since it has less tendency to promote side reactions. In practice, there is often enough moisture present in the system to hydrolyze a small portion of the sulfur tetrafluoride and form catalytic amounts of hydrogen fluoride, e.g., 1–5% on a molar basis, or a small amount of water can be added to the reaction mixture for this purpose. Larger than catalytic amounts of hydrogen fluoride, e.g., from 10–20% of the sulfur tetrafluoride on a molar basis, can be used if desired.

The invention is illustrated in greater detail in the following examples. In these examples the melting points are reported as observed using a Fisher-Johns apparatus and are uncorrected. The optical rotation determinations were made in chloroform (Chf), dioxane (Di) or acetone (An). The values given are followed by the letter c. and a number which indicates the concentration (grams of substance per 100 ml. of solvent).

EXAMPLE 1

*3β,17β-diacetoxy-7,7-difluoroandrostane*

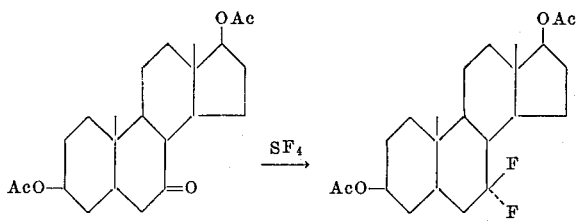

The starting material in this example, 3β,17β-diacetoxyandrostane-7-one, was prepared as described in Parts A and B of the example.

A. To a solution of 3β,17β-diacetoxy-5-androstene (40.0 g.) in acetic acid (135 ml.) and acetic anhydride (74 ml.) at 35° C. was added portionwise solid anhydrous sodium chromate with intermittent cooling to maintain the temperature in the range 30–40° C. The reaction mixture was stirred for 46 hours at 30–40° C. and then poured into two liters of ice cold water. The precipitate was collected by filtration, washed with water and air-dried. The crude product was recrystallized from methanol to give 24.9 g. of 3β,17β-diacetoxy-5-androstene-7-one as a white solid, M.P. 225° C.

Infrared:

$\lambda_{max.}^{Nujol}$ 5.75μ (OAc), 6.0μ (conj.) C–7 C=O), 6.15μ (conj. C=C) and 8.1μ (OAc)

B. A solution of 3β,17β-diacetoxy-5-androstene-7-one (12.3 g.) in glacial acetic acid (50 ml.) and ethanol (50 ml.) containing platinum dioxide catalyst (1.0 g.) was shaken under a hydrogen pressure of 50 p.s.i. for 48 hours at room temperature. The catalyst was removed by filtration and the solvents evaporated under reduced pressure to leave a crystalline residue. The infrared spectrum showed that some reduction of the keto group had taken place in addition to the reduction of the double bond. Accordingly, the product was dissolved in acetone and oxidized by stirring the solution at room temperature for 20 minutes with an excess of Jones reagent (solution of 10.3 g. of chromium trioxide in 30 ml. of water and 3.7 ml. of concentrated sulfuric acid; see Bowden, Heilbron, Jones and Weedon, J. Chem. Soc., 1946, 39). The excess reagent was destroyed by addition of a little methanol and the salts were removed by filtration. Upon dilution of the filtrate with water, the product crystallized. It was collected to yield 9.49 g. of 3β,17β-diacetoxyandrostane-7-one, M.P. 187–190° C.

Infrared:

$\lambda_{max.}^{Nujol}$ 5.77μ (OAc), 5.88μ (C–7 C=O) and 8.0μ (OAc)

C. To a mixture of 3β,17β-diacetoxyandrostane-7-one (9.5 g.), methylene dichloride (100 ml.) and water (1.5 ml.) in a corrosion-resistant bomb cooled in a Dry Ice-acetone bath was added 180 g. of sulfur tetrafluoride. The bomb was agitated for 16 hours at 20° C., after which it was vented and all volatile components were removed under reduced pressure. The reaction product was taken up in methylene chloride and obtained, on evaporation, as a tan crystalline solid. This was recrystallized to give 3β,17β-diacetoxy-7,7-difluoroandrostane (8.7 g.) as a white solid, M.P. 165° C., $[\alpha]_D^{23}$ −6° (c. 2.55, Chf).

*Analysis.*—Calc'd for $C_{2}H_{34}F_2O_4$: C, 66.96; H, 8.31; F, 9.21. Found: C, 67.2; H, 8.63; F, 8.82.

Infrared:

$\lambda_{max.}^{Nujol}$ 5.75μ and 8.0μ (OAc)

Applying the procedure of Example 1–C to 3β,17β-diacetoxyandrostane-7,11-dione, in which the 11-keto group is essentially unreactive, leads to 3β,17β-diacetoxy-7,7-difluoroandrostane-11-one, which can be catalytically reduced to 3β,17β - diacetoxy - 7,7 - difluoroandrostane-11β-ol. Both compounds, if desired, can then be subjected to the further transformations shown in Examples 2 and 3 below.

EXAMPLE 2

*7,7-difluoroandrostane-3β,17β-diol*

A solution of 3β,17β-diacetoxy-7,7-difluoroandrostane, concentrated hydrochloric acid (15 ml.) and methanol (150 ml.) was heated to reflux for one hour. To the hot solution was added enough water to make it slightly turbid. On cooling, white crystals of 7,7-difluoroandrostane-3β,17β-diol (6.05 g.) separated. After recrystallization from an acetone-hexane mixture, the product melted at 185–187° C., $[\alpha]_D^{23}$ +6° (c. 2.85, Di). It contained one-half mole of water of crystallization.

*Analysis.*—Calc'd for $C_{19}H_{30}F_2O_2 \cdot \frac{1}{2}H_2O$: C, 67.65; H, 9.19; F, 11.27. Found: C, 67.37; H, 9.34; F, 10.44.

Infrared:

$\lambda_{max.}^{Nujol}$ 2.89μ, 2.95μ (OH), 9.74μ (C—O)

EXAMPLE 3

*7,7-difluoroandrostane-3,17-dione*

A solution of 7,7-difluoroandrostane-3β,17β-diol (6.0 g). in acetone (75 ml.) was treated with an excess of Jones reagent at 5–10° C. The excess oxidizing agent was destroyed by addition of methanol and the salts were removed by filtration. Upon dilution of the filtrate with water, there was obtained 3.68 g. of 7,7-difluoroandrostane-3,17-dione. After recrystallization from an acetone-hexane mixture, the product melted at 192° C., $[\alpha]_D^{23}$ +77° (c. 2.61, Chf).

*Analysis.*—Calc'd for $C_{19}H_{26}F_2O_2$: C, 70.37; H, 8.02; F, 11.72. Found: C, 70.45; H, 8.22; F, 11.59.

Infrared:

$\lambda_{max.}^{Nujol}$ 5.74μ (C–17 C=O), 5.79μ C–3 C=O)

From 7,7 - difluoroandrostane - 3,17 - dione, the corresponding 7,7 - difluoro - 1,4 - androstadiene - 3.17-dione can be obtained by the use of dehydrogenating agents such as selenium dioxide in tert.-butyl alcohol [the use of selenium dioxide for introducing unsaturation is discussed by, e.g., Martin and Pike, J. Org. Chem. 27, 4086 (1962) and Djerassi, "Steroid Reactions" (1963), pp. 233–234].

EXAMPLES 4 AND 5

*7,7 - difluoroandrostane - 17β - ol - 3 - one (7,7-difluorodihydrotestosterone)*

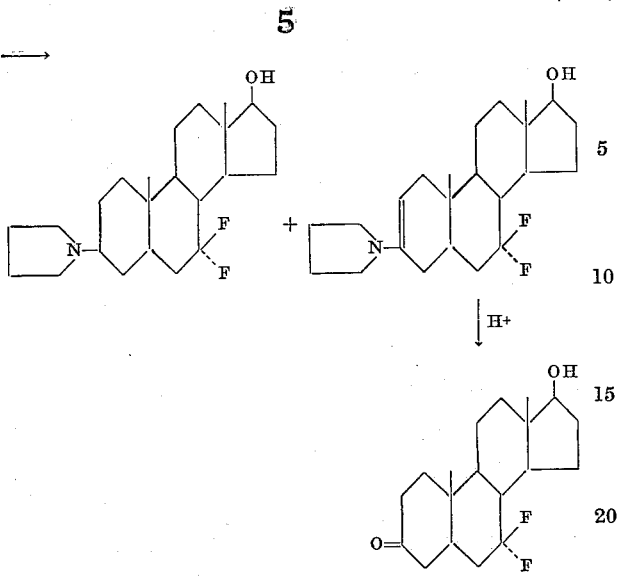

↓ H+

*Example 4.*—A solution of 7,7-difluoroandrostane-3,17-dione (5.5 g.), pyrrolidine (5.0 ml.) and benzene (30 ml.) was heated to reflux for 3 hours while removing the water of reaction with a moisture trap. A total of 0.4 ml. of water was collected. The solvents were removed under reduced pressure to give a tan solid shown by its infrared spectrum to be 7,7-difluoro - 3 - pyrrolidinyl-2-androstene-17-one.
Infrared:

$\lambda_{max.}^{Nujol}$ 3.25μ (HO=C), 5.73μ (C-17 C=O), 6.08μ (C=C)

This product was carried on to the next step without further purification.

*Example 5.*—To be stirred solution of the above product (5.5 g.) in dry tetrahydrofuran (200 ml.) was added portionwise solid lithium tri(t.-butoxy)aluminum hydride (13.0 g.). The resulting solution was stirred for 48 hours at room temperature. It was then poured into cold methanol (200 ml.) containing glacial acetic acid (20 ml.) and sodium acetate (10 g.) and the mixture was warmed on a steam bath for one hour. Dilution with water precipitated a solid which was collected by filtration, washed well with water and air-dried. This solid (2.74 g.) was 7,7-difluoroandrostane-17β-ol-3-one, as shown by its infrared spectrum.

To the filtrate from the above operation was added an excess of solid sodium chloride and the mixture was thoroughly extracted with methylene chloride to give an additional amount of product (3.0 g.) which did not crystallize. This product was combined with the previously obtained solid. The total material was dissolved in a little benzene and the solution was absorbed on a column of neutral alumina (100 g., activity III) for chromatographic separation.

Elution with petroleum ether-benzene (1:1) gave a solid material (1.52 g.). Continued elution with benzene yielded more solid (1.007 g.). Finally, the column was stripped with benzene-diethyl ether (3:1 and 1:1) to give an amorphous material (0.77 g.). The petroleum ether-benzene and benzene eluates were combined and recrystallized from acetone containing a little hexane to give 1.542 g. of 7,7-difluoroandrostane-17β-ol-3-one (7,7-difluorodihydrotestosterone) as large, colorless blades, M.P. 204–205° C., [α]$_D^{25}$ +11° (c. 2.89, An).

*Analysis.*—Calc'd for $C_{19}H_{28}F_2O_2$: C, 69.93; H, 8.41; F, 11.65. Found: C, 69.51; H, 8.75; F, 11.57.
Infrared:

$\lambda_{max.}^{Nujol}$ 2.75μ, 2.9μ (OH), 5.85μ (C-3 C=O), 8.65, 8.72 and 8.85μ (>CF$_2$)

The benzene-ether eluates from the chromatographic separation were combined and recrystallized from acetone-hexane to give 0.65 g. of 7,7-difluoro-3β-pyrrolidinylandrostane-17β-ol as long thread-like needles.
Infrared:

$\lambda_{max.}^{Nujol}$ 3.15μ, broad (CHOH)

EXAMPLE 6

*3β-acetoxy-7,7,17,17-tetrafluoroandrostane and 3β-acetoxy-7,7-difluoroandrostane-17-one*

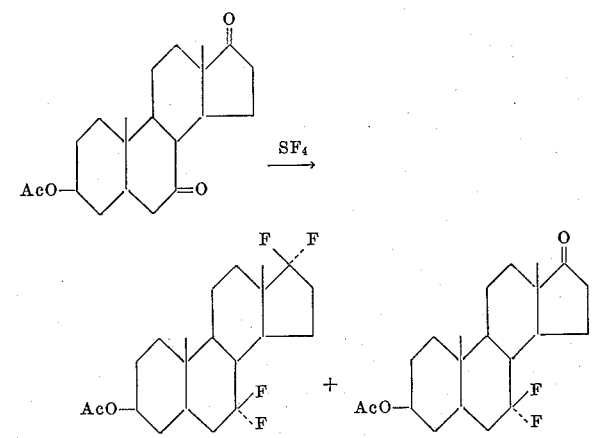

The starting material in this example was prepared as follows:

A. 3β-acetoxy-5-androstene-17-one (40 g.) was oxidized with sodium chromate, using the procedure described by Marshall, Ray, Laos and Riegel in J. Am. Chem. Soc. 79, 6308 (1957). The reaction mixture was then poured into two liters of cold water. After allowing to stand for several hours with occasional stirring, the granular solid was collected by filtration, washed well with water and air-dried. Recrystallization of the total crude product from methanol afforded 3β-acetoxy-5-androstene-7,17-dione (30.0 g.) as white needles, M.P. 182–185°C.
Infrared:

$\lambda_{max.}^{Nujol}$ 5.80μ (C-17 C=O and OAc), 5.98μ (C-7 conj. C=O), 6.15μ (conj. C=C) and 8.15μ (OAc)

B. A solution of 3β-acetoxy-5-androstene-7,17-dione (19 g.), glacial acetic acid (75 ml.) and absolute ethanol (75 ml.) containing platinum dioxide (2.0 g.) was shaken at room temperature under a hydrogen pressure of 30 p.s.i. Hydrogen absorption was rapid, and after three hours was complete. The mixture was filtered to remove the catalyst and the solvents were evaporated under reduced pressure to leave a crystalline residue. This was dissolved in acetone (50.0 ml.) and treated with excess Jones reagent as in Example 1–B. Excess oxidizing reagent was destroyed with methanol and the mixture was filtered to remove salts. Slow addition of water to the filtrate caused the product to crystallize. It was collected by filtration, washed with cold dilute acetone and air-dried. The yield of 3β-acetoxyandrostane-7,17-dione amounted to 15.80 g.
Infrared:

$\lambda_{max.}^{Nujol}$ 5.78μ (OAc and C-17 C=O), 5.85μ (C-7 C=O) and 8.15μ (OAc)

C. The above product was fluorinated at the 7-position as follows:

A solution of 3β-acetoxyandrostane-7,17-dione (15.8 g.) in methylene dichloride (100 ml.) containing sulfur tetrafluoride (200 g.) and water (2 ml.) was shaken at 20° C. in a closed reactor for 30 hours, after which time the reactor was vented and swept with nitrogen and its contents were poured into cold water. The organic phase was taken up in methylene chloride. Evaporation of the solvent gave a tan syrup which solidified. The infrared spectrum of this product showed the absence of C-7 C=O band. The total crude product was chromatographed on netural alumina (300 g., activity III). Elution with petroleum ether (cuts 1 through 23) afforded a crystalline material, yield 11.0 g. These fractions were combined and recrystallized from petroleum ether-hexane to give 3β-acetoxy-7,7,17,17-tetrafluoroandrostane (7.5 g.), M.P. 155–156.5° C. [α]$_D^{23}$ −14° (c. 2.59, Chf).

*Analysis.*—Calc'd for $C_{21}H_{30}F_4O_2$: C, 64.70; H, 7.73; F, 19.5. Found: C, 64.70; H, 7.68; F, 19.5.

Infrared:

$$\lambda_{max.}^{Nujol}\ 5.78\mu\ (OAc)\ and\ 8.15\mu\ (OAc)$$

Further elution with petroleum ether-benzene (1:1) and benzene afforded additional crystalline product (25 g.) whose infrared spectrum indicated it to be 3β-acetoxy-7,7-difluoroandrostane-17-one.

3β-acetoxy-7,7-difluoroandrostane-17-one can in turn be subjected to the following transformations, using known procedures: (a) treatment with sodium acetylide or with acetylene in potassium tert-amylate, followed by acidification, to produce 17α-ethynyl-7,7-difluoroandrostane-3β,17β-diol; and (b) catalytic reduction of the latter in the presence of a palladium-on-strontium carbonate catalyst to give 7,7-difluoro-17α-vinylandrostane-3β,17β-diol. These products can then be acylated, for example, converted to the hexanoates.

EXAMPLE 7

*7,7,17,17-tetrafluoroandrostane-3β-ol*

A solution of 3β-acetoxy-7,7,17,17-tetrafluoroandrostane (7.0 g.), concentrated hydrochloric acid (20 ml.) and methanol (150 ml.) was heated to reflux for one hour. Addition of water to the reaction mixture followed by slow cooling resulted in the crystallization of the resulting 7,7,17,17-tetrafluoroandrostane-3β-ol (6.5 g.). An analytical sample was crystallized from acetone-hexane, M.P. 144–152° C., [α]$_D^{23}$ ±0° (c. 2.00 Chf).

*Analysis.*—Calc'd for $C_{19}H_{28}O$: C, 65.5; H, 8.08; F, 21.8. Found: C, 65.83; H, 8.32; F, 21.67.

Infrared:

$$\lambda_{max.}^{Nujol}\ 2.98\mu\ (OH)$$

EXAMPLE 8

*7,7,17,17-tetrafluoroandrostane-3-one*

The product of Example 7 (6.0 g.) was oxidized with excess Jones reagent as described in Example 1–B. The reaction product was recrystallized from acetone to give 7,7,17,17-tetrafluoroandrostane-3-one (4.16 g.), M.P. 246–248° C., [α]$_D^{23}$ −2° (c. 2.48, Chf).

*Analysis.*—Calc'd for $C_{19}H_{26}F_4O$: C, 66.21; H, 7.55; F, 21.9. Found: C, 66.11; H, 7.65; F, 21.76.

Infrared:

$$\lambda_{max.}^{Nujol}\ 5.82\mu\ (C-3\ C=O),\ 8.55,\ 8.72,\ and\ 8.88\mu\ (>CF_2)$$

EXAMPLE 9

*7,7,17,17-tetrafluoro-1-androstene-3-one*

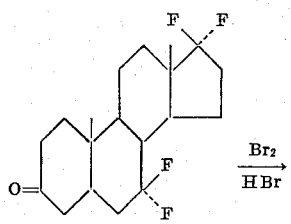

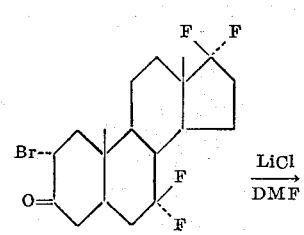

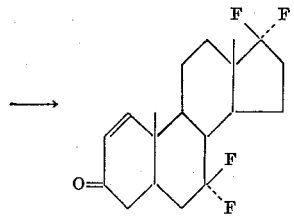

A. To a stirred stolution of 7,7,17,17-tetrafluoroandrostane-3-one (2.32 g.) and glacial acetic acid (50 ml.) containing 6 drops of 48% hydrobromic acid solution, there was added dropwise over 20 minutes a solution of bromine in glacial acetic acid (1.1 mole equivalents of bromine). The solution was then stirred an additional 30 minutes with cooling in an ice bath. Dilution with water precipitated the reaction product. Recrystallization from acetone afforded 2α-bromo-7,7,17,17-tetrafluoroandrostane-3-one (1.79 g.) as a crystalline solid, M.P. 214–217° C., [α]$_D^{23}$ +9° (c. 2.68 Chf).

*Analysis.*—Calc'd for $C_{19}H_{25}BrF_4O$: C, 53.64; H, 5.88. Found: C, 53.80; H, 6.12.

Infrared:

$$\lambda_{max.}^{Nujol}\ 5.82\mu\ (C-3\ C=O),\ 8.55,\ 8.68\ and\ 8.85\mu\ (>CF_2)$$

Ultraviolet:

$$\lambda_{max.}^{EtOH}\ 275m\mu\ (K=0.112)$$

B. A solution of 2α-bromo-7,7,17,17-tetrafluoroandrostane-3-one (1.7 g.) and anhydrous lithium chloride (0.73 g.) in dimethylformamide (100 ml.) was heated at 150° C. for 24 hours under a nitrogen atmosphere. The dark reaction mixture was diluted with water and the product was isolated with methylene chloride, then purified by chromatography on neutral alumina (60 g., activity III). Elution with petroleum ether-benzene (1:1) returned a crystalline solid which was recrystallized from hexane to give 0.6 g. of 7,7,17,17-tetrafluoro-1-androstene-3-one, M.P. 197–199° C., [α]$_D^{23}$ +16° (c. 2.52, Chf). A sample was sublimed for analysis.

*Analysis.*—Calc'd for $C_{19}H_{24}F_4O$: C, 66.3; H, 7.02; F, 22.0. Found: C, 66.59; H, 7.29; F, 22.07.

Infrared:

$$\lambda_{max.}^{Nujol}\ 5.91\mu\ (C-3\ conj.\ C=O),\ 8.53\mu\ and\ 8.85\mu\ (>CF_2)$$

Ultraviolet:

$$\lambda_{max.}^{EtOH}\ 226m\mu\ (\epsilon=10,000)$$

If an excess of bromine is used in carrying out Part A of this example, a dibromo derivative, 2α,4α-dibromo-7,7,17,17-tetrafluoroandrostane-3-one, is obtained. The 2,4-dibromo compound can be treated with sodium iodide, whereby the 2α-bromine atom is replaced by iodine, with simultaneous removal of hydrogen bromide and formation of a double bond between the 4- and 5-carbons. Treatment of the resulting product with chromous chloride (see Fieser and Fieser, "Steroids," p. 287) leads to 7,7,17,17-tetrafluoro-4-androstene-3-one.

EXAMPLE 10

*3β,17α-diacetoxy-7,7-difluoropregnane-20-one*

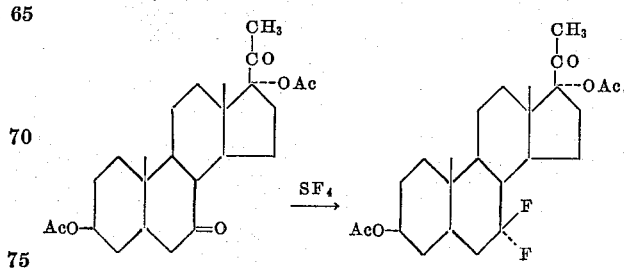

The starting material in this example was prepared as follows:

A. A 40-g. portion of 3β,17α-diacetoxy-5-pregnene-20-one was oxidized with sodium chromate by the procedure referred to in Example 6–A. After recrystallization from methanol, there was obtained 26.3 g. of 3β,17α-diacetoxy-5-pregnene-7,20-dione, M.P. 225–230° C.

B. Hydrogenation of this product (13.65 g.) in glacial acetic acid (70 ml.) and ethanol (70 ml.) over platinum dioxide (3.0 g.) at room temperature and 20 p.s.i. hydrogen pressure for 3 hours, followed by oxidation with Jones reagent, as previously described, and recrystallization from acetone-water, gave 10.6 g. of 3β,17α-diacetoxypregnane-7,20-dione, M.P. 247–255° C.

Infrared:

$\lambda_{max.}^{Nujol}$ 5.78μ (OAc), 5.85μ (C-7 C=O), 5.88μ (C-20 C=O) and 8.15μ (OAc)

C. The above product was fluorinated as follows:

A mixture of 3β,17α-diacetoxypregnane-3,20-dione (10.0 g.), methylene chloride (100 ml.), water (1.0 ml.) and sulfur tetrafluoride (150 g.) was shaken in a pressure bomb at 20±2° C. for 8 hours, after which it was rapidly cooled to −30° C. The reaction product was isolated as described in Example 1–C to give a colorless crystalline solid. Recrystallization from a methylene chloride-hexane mixture afforded 5.4 g. of 3β,17α-diacetoxy-7,7-difluoropregnane-20-one as thick colorless rods, M.P. 222.5–224° C., [α]$_D^{23}$ −11° (c. 2.45, Chf).

Analysis.—Calc'd for $C_{25}H_{36}F_2O_5$: C, 66.9; H, 7.99; F, 8.36. Found: C, 65.94; H, 8.13; F, 7.98.

Infrared:

$\lambda_{max.}^{Nujol}$ 5.78μ (OAc), 5.87μ (C-20 C=O), 8.69 and 8.89μ (>CF$_2$)

By carrying out the procedure of this example with 3α,21-diacetoxy-5-pregnene-20-one as the starting material, there is obtained 3α,21-diacetoxy-7,7-difluoropregnane-20-one which, if desired, can be dehydrogenated to 3α,21-diacetoxy-7,7-difluoro-1,4-pregnadiene-20 - one by treatment with selenium dioxide in tert.-butyl alcohol. Furthermore, the corresponding 3β-acetoxy-7,7-difluoropregnane-17α,21-diol-20-one can be obtained by reacting 3β-acetoxy-20,21-bismethylenedioxypregnane-7 - one with sulfur tetrafluoride as described in Part C [reactions of this type are discussed by Martin and Pike, J. Org. Chem. 27, 4086 (1962)] followed by hydrolysis of the 20,21-bismethylenedioxy group.

EXAMPLE 11

17α-acetoxy-7,7-difluoropregnane-3β-ol-20-one

A solution of 3β,17α-diacetoxy-7,7-difluoropregnane-20-one (6.31 g.), concentrated hydrochloric acid (10 ml.) and methanol (100 ml.) was heated to reflux for one hour. Upon dilution with water and slow cooling to room temperature, crystallization took place. There was obtained 4.48 g. of 17α-acetoxy-7,7-difluoropregnane-3β-ol-20-one, M.P. 225–227° C., [α]$_D^{23}$ −28° (c. 2.50, Chf). An analytical sample was recrystallized from acetone-hexane.

Analysis.—Calc'd for $C_{23}H_{34}F_2O_4$: C, 67.00; H, 8.31. Found: C, 67.38; H, 8.67.

Infrared:

$\lambda_{max.}^{Nujol}$ 2.85μ (OH), 5.75μ (OAc), 5.85μ (C-20 C=O), 8.10μ OAc), 8.65 and 8.85μ (>CF$_2$)

If desired, this compound can be reduced to 17α-acetoxy-7,7-difluoropregnane - 3β,20 - diol by catalytic methods.

EXAMPLE 12

17α-acetoxy-77-difluoropregnane-3,20-dione

A solution of 17α-acetoxy-7,7-difluoropregnane-3β-ol-20-one (5.0 g.) and acetone (50 ml.) was treated with excess Jones reagent with cooling. The oxidation product was worked up as in Example 1–B and recrystallized from acetone-water to give 3.42 g. of 17α-acetoxy-7,7-difluoropregnane-3,20-dione as long white needles, M.P. 190–196° C. An analytical sample recrystallized from acetone-hexane, melted at 193–195° C., [α]$_D^{23}$ −21° (c. 2.65, Chf).

Analysis.—Calc'd for $C_{23}H_{32}F_2O_4$: C, 67.4; H, 7.83. Found: C, 67.87; H, 7.96.

Infrared:

$\lambda_{max.}^{Nujol}$ 5.75μ (OAc), 5.82μ (C-3 C=O), 8.0μ (OAc), 8.6 and 8.85μ (>CF$_2$)

Repeating the procedure of Examples 11 and 12 with 3α,21-diacetoxy-7,7-difluoropregnane-20-one leads to 21-acetoxy-7,7-difluoropregnane-3,20-dione.

EXAMPLE 13

17α-acetoxy-7,7-difluoro-1-pregnene-3,20-dione

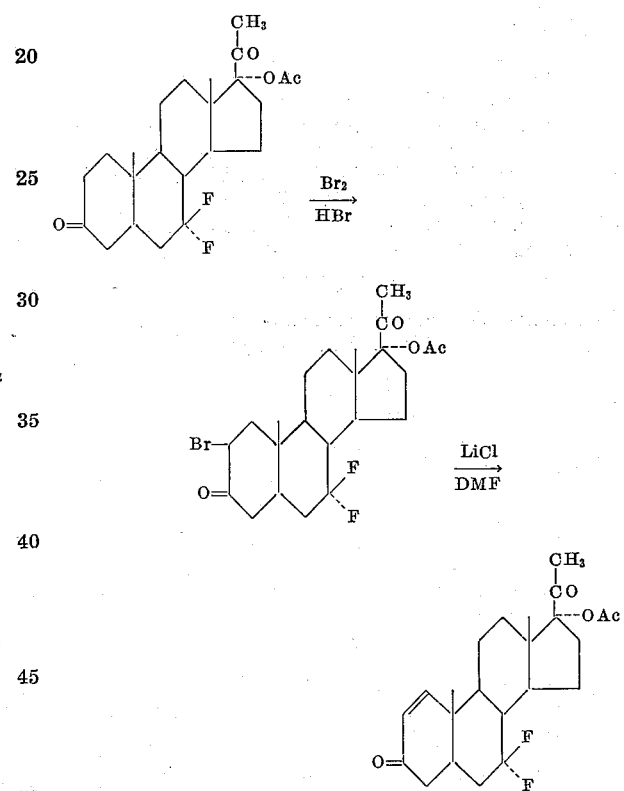

A. To a stirred solution of 17α-acetoxy-7,7-difluoropregnane-3,20-dione (3.0 g.), glacial acetic acid (50 ml.) and diethyl ether (20 ml.) containing 6 drops of 48% hydrobromic acid solution was added dropwise over 20 minutes a solution of bromine in glacial acetic acid (1.1 mole equivalents of bromine) while cooling in an ice bath. The reaction mixture was stirred an additional 30 minutes, after which it was diluted with water. The reaction product was isolated with methylene chloride and purified by chromatography on neutral alumina (100 g., activity III). Elution with petroleum ether-benzene (1:1) returned a crystalline product in several cuts. These fractions were combined and recrystallized from acetone-hexane. On slow cooling, 1.013 g. of 17α-acetoxy-2α-bromo-7,7-difluoropregnane - 3,20 - dione was obtained as colorless prisms, M.P. 200–205° C. An analytical sample recrystallized from the same solvent pair melted at 209° C. (sintering at 203° C.), [α]$_D^{23}$ +6° (c. 2.35, Chf).

Analysis.—Calc'd for $C_{23}H_{31}BrF_2O_4$: C, 56.7; H, 6.38; F, 7.77. Found: C, 56.72; H, 6.37; F, 8.17.

Infrared:

$\lambda_{max.}^{Nujol}$ 5.75μ (OAc), 5.80μ (C-3 C=O), 5.85μ (C-20 C=O), 7.9 and 8.0μ (OAc), 8.6 and 8.85μ (>CF$_2$)

Ultraviolet:

$$\lambda_{max.}^{EtOH} \ 284m\mu \ (\epsilon=83)$$

B. A mixture of the above product (0.392 g.), anhydrous lithium chloride (0.159 g.) and dimethylformamide (22 ml.) was heated at 150° C. for 3 hours under a nitrogen atmosphere. The reaction mixture was diluted with water and the product was isolated with methylene chloride as a tan crystalline solid. Recrystallization from hexane-acetone gave 0.150 g. of 17α-acetoxy-7,7-difluoro-1-pregnene-3,20-dione as pale yellow leaflets, M.P. 220–225° C., [α]$_D^{23}$ +20° (c. 2.00, Chf).

*Analysis.*—Calc'd for $C_{23}H_{30}F_2O_4$: C, 67.6; H, 7.65; F, 9.28. Found: C, 67.53; H, 7.55; F, 8.47.

Infrared:

$\lambda_{max.}^{Nujol}$ 5.75μ (OAc), 5.85μ (C-20 C=O), 5.95μ (conj. C-3 C=O), 5.98μ (conj. C=C, shoulder), 7.9 and 8.0μ (OAc), 8.65 and 8.9μ (>CF$_2$)

Ultraviolet:

$$\lambda_{max.}^{EtOH} \ 226m\mu \ (\epsilon=10,000), \ 283m\mu \ (\epsilon=1200)$$

A sample which had been purified by chromatography followed by two recrystallizations from methanol melted at 238–241° C. and showed maximum absorption in the ultraviolet at 226 mμ (ε=11,300) and 282 mμ (ε=260).

By applying the method of this Example to 21-acetoxy-7,7-difluoropregnane-3,20-dione, there is obtained 21-acetoxy-7,7-difluoro-1-pregnene-3,20-dione.

EXAMPLE 14

*3β-acetoxy-7,7-difluoropregnane-20-one and 3β-acetoxy-7,7,20,20-tetrafluoropregnane*

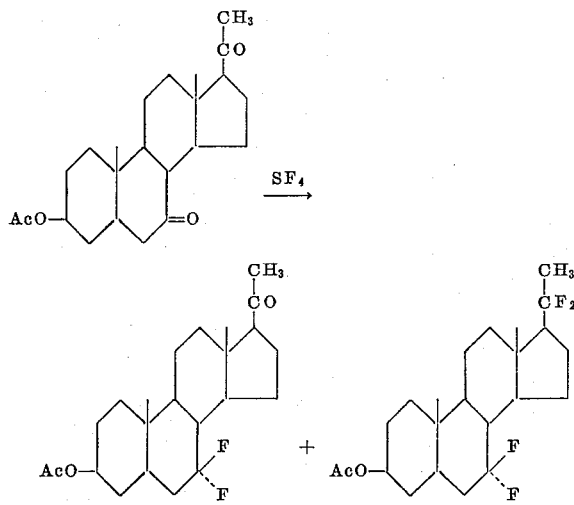

The starting material was prepared as follows:

A. A 40-g. portion of 3β-acetoxy-5-pregnene-20-one was oxidized with sodium chromate by the procedure referred to in Example 6-A. After recrystallization from methanol, there was obtained 21.76 g. of 3β-acetoxy-5-pregnene-7,20-dione as colorless needles, M.P. 153–154° C.

Infrared:

$\lambda_{max.}^{Nujol}$ 5.78μ (OAc), 5.88μ (C-20 C=O), 5.98μ (C-7 conj. C=O), 614μ (conj. C=C), and 8.1μ (OAc)

B. Hydrogenation of this product (17.15 g.) in glacial acetic acid (50 ml.) and ethanol (50 ml.) containing platinum dioxide (2.0 g.) at room temperature and 150 p.s.i. hydrogen pressure for 48 hours, followed by oxidation with Jones reagent as previously described, and recrystallization from acetone-water, gave 14.2 g. of 3β-acetoxypregnane-7,20-dione as a snow-white solid, M.P. 177–179° C.

Infrared:

$\lambda_{max.}^{Nujol}$ 5.78μ (OAc), 5.88μ (C-7 and C-20 C=O), and 8.0μ (OAc)

C. The above product was fluorinated as follows:

A mixture of 3β-acetoxypregnane-7,20-dione (14.2 g.), methylene chloride (100 ml.), sulfur tetrachloride (200 g.), and water (2 ml.) was agitated in a pressure vessel for 30 hours at 22° C. The reaction product was isolated with methylene chloride and chromatographed on neutral alumina (300 g., activity III). Elution with petroleum ether (three cuts of 200 ml. each) returned a crystalline product and the infrared spectrum of cut 3 showed that this material (4.6 g.) was 3β-acetoxy-7,7,20,20-tetrafluoropregnane. After recrystallization from hexane, the product was obtained as large colorless prisms, M.P. 182–183° C., [α]$_D^{23}$ −3° (c 2.77, Chf).

*Analysis.*—Calc'd for $C_{23}H_{34}F_4O_2$: C, 66.1; H, 8.17; F, 18.15. Found: C, 66.21; H, 8.49; F, 17.53.

Infrared:

$\lambda_{max.}^{Nujol}$ 5.78μ (OAc), 8.55, 8.6, 8.7, and 8.8μ (>CF$_2$)

Continued elution with petroleum ether (cuts 4–29, of about 100 ml. each) and benzene (two 75-ml. cuts) gave a solid material which was shown by its infrared spectrum to be 3β-acetoxy-7,7-difluoropregnane-20-one. This material (9.7 g.) was recrystallized from hexane to give a purer product (7.5 g.) which was subjected again to treatment with sulfur tetrafluoride as described above with the exception that the reaction time was limited to 20 hours. A similar chromatographic treatment of the reaction product yielded, first, an additional 2.5 g. of 3β-acetoxy-7,7,20,20-tetrafluoropregnane, then 3.36 g. (after recrystallization from acetone-hexane) of 3β-acetoxy-7,7-difluoropregnane-20-one, M.P. 163–167° C. An analytical sample recrystallized from the same solvent pair melted at 168–173° C., [α]$_D^{23}$ +42° (c. 2.38, Chf).

*Analysis.*—Calc'd for $C_{23}H_{34}F_2O_3$: C, 69.9; H, 8.63; F, 9.58. Found: C, 68.7; H, 8.55; F, 9.82.

Infrared:

$\lambda_{max.}^{Nujol}$ 5.78μ (OAc), 5.88μ (C-20 C=O), 8.45, 8.62 and 8.72μ (>CF$_2$)

By applying the procedure of this Example to 3β-acetoxy-5-pregnene-11,20-dione, there are obtained 3β-acetoxy-7,7-difluoropregnane-11,20-dione and 3β-acetoxy-7,7,20,20-tetrafluoropregnane-11-one. The latter can be reduced to 3β-acetoxy-7,7,20,20-tetrafluoropregnane-11-ol.

EXAMPLE 15

*7,7,20,20-tetrafluoropregnane-3β-ol*

A 2.0-g. sample of 3β-acetoxy-7,7,20,20-tetrafluoropregnane was hydrolyzed with hydrochloric acid and methanol essentially as described in Example 11. There was obtained 1.8 g. of 7,7,20,20-tetrafluoropregnane-3β-ol which, after recrystallization from acetone-hexane, formed fine white needles, M.P. 165–166° C., [α]$_D^{23}$ +7° (c. 2.57, An).

*Analysis.*—Calc'd for $C_{21}H_{32}F_4O$: C, 67.1; H, 8.58; F, 20.2. Found: C, 67.69; H, 9.09; F, 19.76.

EXAMPLE 16

*7,7,20,20-tetrafluoropregnane-3-one*

A 1.7-g. sample of 7,7,20,20-tetrafluoropregnane-3β-ol was oxidized with excess Jones reagent essentially as described in Example 1–B. The resulting 7,7,20,20-tetrafluoropregnane-3-one (1.47 g.) was recrystallized from hexane to give long white needles, M.P. 157.5–158.5° C., [α]$_D^{23}$ +13° (c. 2.31, Chf).

*Analysis.*—Calc'd for $C_{21}H_{30}F_4O$: C, 67.20; H, 8.08; F, 20.2. Found: C, 67.52; H, 8.21; F, 20.0.

Infrared:

$\lambda_{max.}^{Nujol}$ 5.80μ (C-3 C=O), 8.55, 8.7, 8.8 and 9.0μ (>CF$_2$)

The product of this example can be converted to 7,7,20,20-tetrafluoro-1,4-pregnadiene-3-one by microbiological oxidation methods.

EXAMPLE 17

17β-acetoxy-7,7-difluoroandrostane-3-one

A solution of 7,7-difluoroandrostane-17β-ol-3-one, prepared as in Example 4, (1.6 g.), dry pyridine (20 ml.) and acetic anhydride (30 ml.) was heated briefly on a steam bath and then allowed to stand overnight at room temperature. The solvents were removed under reduced pressure, and recrystallization of the solid residue from acetone-hexane afforded 1.89 g. of 17β-acetoxy-7,7-difluoroandrostane-3-one. An analytical sample recrystallized from acetone-hexane melted at 169–171° C., $[\alpha]_D^{24}$ +6° (c. 2.34, Chf).

Analysis.—Calc'd for $C_{21}H_{30}F_2O_3$: C, 68.40; H, 8.19; F, 10.30. Found: C, 68.50; H, 8.49; F, 10.42.

Infrared:

$\lambda_{max.}^{Nujol}$ 5.78μ (C–3 C=O and OAc), 8.05μ (OAc), 8.6, 8.7 and 8.95μ (>CF₂)

The product of this example can be converted to 17α-propyl-7,7-difluoroandrostane-17β-ol-3-one by first hydrolyzing the 17-acetoxy group, then converting the 3-keto group to the 3-ethylene ketal group, then oxidizing the 17-hydroxyl to 17-keto by means of chromium trioxide in pyridine, and finally reacting with propylmagnesium iodide, followed by hydrolysis to regenerate the 3-keto group. The same sequence of reactions, except that the last one is replaced by treatment with sodium acetylide in dimethyl sulfoxide, will lead to 17α-ethynyl-7,7-difluoroandrostane-17β-ol-3-one.

EXAMPLE 18

17β-acetoxy-7,7-difluoro-1-androstene-3-one

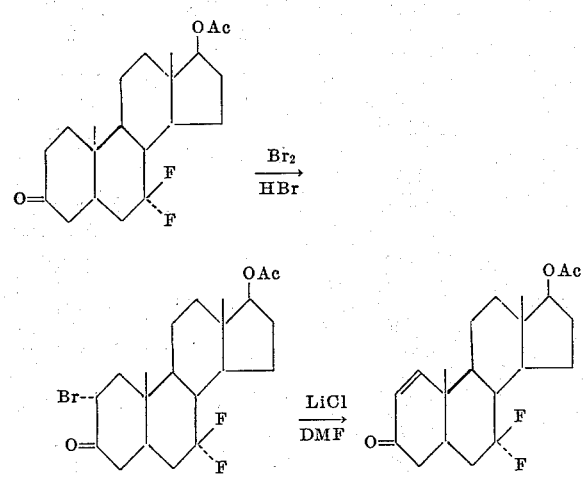

A. To a stirred solution, cooled in an ice bath, of 17β-acetoxy-7,7-difluoroandrostane-3-one (1.36 g.), glacial acetic acid (50 ml.) and diethyl ether (20 ml.) containing 6 drops of 48% hydrobromic acid solution, there was added dropwise over 20 minutes a solution of bromine in acetic acid (1.1 mole equivalents of bromine). After stirring for an additional 30 minutes, the reaction mixture was diluted with water. The precipitated reaction product was isolated with methylene chloride. After evaporating the solvent, the solid residue was recrystallized from acetone-hexane to give 1.22 g. of 17β-acetoxy-2α-bromo-7,7-difluoroandrostane-3-one as well formed white crystals, M.P. 228–230° C.

Analysis.—Calc'd for $C_{21}H_{29}BrF_2O_3$: C, 56.4; H, 6.53; Br, 17.83; F, 8.5. Found: C, 56.66; H, 6.80; Br, 17.72; F, 8.22.

Infrared:

$\lambda_{max.}^{Nujol}$ 5.78μ (C–3 C=O and OAc), 8.05μ (OAc), 8.6 and 8.72μ (>CF₂)

B. A solution of 17β-acetoxy-2α-bromo-7,7-difluoroandrostane-3-one (1.05 g.) in dry dimethylformamide (15 ml.) containing anhydrous lithium chloride (0.43 g.) was heated at 150° C. for 3 hours in a nitrogen atmosphere. The reaction mixture was diluted with water and the product was extracted with methylene chloride. The light yellow solid residue left after evaporation of the solvent was chromatographed on neutral alumina (30 g., activity III). Elution with petroleum ether-hexane returned a crystalline product in several cuts. The fractions were combined and recrystallized from methanol. The resulting colorless needles were recrystallized from acetone-hexane to give 0.439 g. of 17β-acetoxy-7,7-difluoro-1-androstene-3-one, M.P. 145–148° C., $[\alpha]_D^{23}$ +33° (c. 1.88, Chf).

Analysis.—Calc'd for $C_{21}H_{28}F_2O_3$: C, 68.8; H, 7.71; F, 10.35. Found: C, 68.15; H, 7.60; F, 10.64.

Infrared:

$\lambda_{max.}^{Nujol}$ 5.75μ (OAc), 5.92μ (conj. C=C), 7.95μ (OAc), 8.65μ (>CF₂)

Ultraviolet:

$\lambda_{max.}^{EtOH}$ 227mμ (ε=10,800), and 285mμ (ε=140)

The product of this example can be converted to 17β-acetoxy-7,7-difluoro-1,4-androstadiene-3-one by oxidation with 2,3-dichloro-5,6-dicyanobenzoquinone. It can also be hydrolyzed to 7,7-difluoro-1-androstene-17β-ol-3-one, and the latter can be converted to 7,7-difluoro-1-androstene-3,17-dione by first forming the 3-ethylene ketal, then oxidizing it to the 17-keto compound with chromium trioxide in pyridine, and finally regenerating the 3-keto group by hydrolysis.

EXAMPLE 19

17α-acetoxy-7,7-difluoro-1,4-pregnadiene-3,20-dione

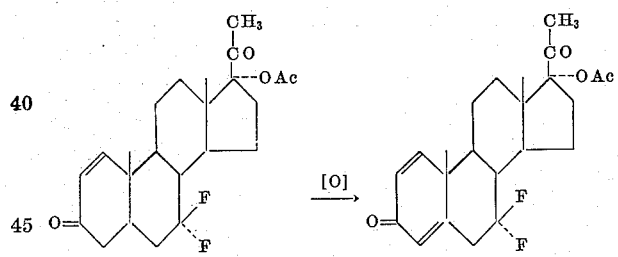

A solution of 17α-acetoxy-7,7-difluoro-1-pregnene-3,20-dione (0.845 g.), 2,3-dichloro-5,6-dicyanobenzoquinone (0.650 g.) and p-toluenesulfonic acid (13.5 mg.) in dry toluene (14 ml.) was heated to reflux with stirring, during which time a dark precipitate formed. The reaction mixture was diluted with benzene and washed with cold 1 N aqueous sodium hydroxide. The organic phase was further washed with water, then with a saturated aqueous sodium chloride solution, and dried over magnesium sulfate. Evaporation of the solvent under reduced pressure left a clear residue which crystallized when triturated with an acetone-hexane mixture.

The total crude product was chromatographed on neutral alumina (30 g., activity III). Elution with petroleum ether-benzene (1:1) returned first 76 mg. of the starting material. Further elution with the same solvent pair returned a colorless crystalline product (0.308 g.) which was shown by spectral and elemental analyses to be the desired 17α-acetoxy-7,7-difluoro-1,4-pregnadiene-3,20-dione. A center cut was recrystallized from methanol to give colorless prisms melting at 243–245° C.

Analysis.—Calc'd for $C_{23}H_{28}F_2O_4$: C, 68.0; H, 6.90. Found: C, 66.98; H, 7.04.

Infrared:

$\lambda_{max.}^{Nujol}$ 5.75 and 7.95μ (OAc), 5.81μ (C–20 C=O), 5.97μ (conj. C–3 C=O), 6.1 and 6.19μ (conj. C=C's) and 8.85μ (>CF₂)

Ultraviolet:

$$\lambda_{max.}^{EtOH} \; 239m\mu \; (\epsilon=15,500)$$

EXAMPLE 20

7,7,17,17-tetrafluoro-1,4-androstadiene-3-one

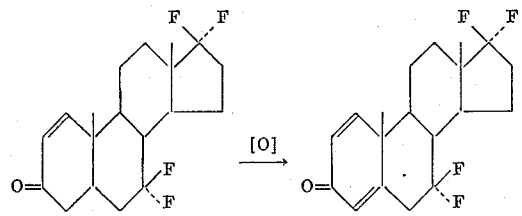

A solution of 7,7,17,17-tetrafluoro-1-androstene-3-one (2.71 g.) and p-toluenesulfonic acid (35 mg.) in dry toluene (40 ml.) was heated to reflux and a few ml. of distillate was collected, using a water separator, to remove traces of water. The solution was then cooled, solid 2,3-dichloro-5,6-dicyanobenzoquinone (20 g.) was added, and the solution was heated to reflux under nitrogen for 20 hours, during which time a precipitate formed. The reaction mixture was then diluted with water and extracted thoroughly with benzene. The benzene extracts were washed with cold 5% aqueous sodium bicarbonate, cold 1 N aqueous sodium hydroxide, water, and finally saturated aqueous sodium chloride. After drying the solution over anhydrous magnesium sulfate, the solvent was removed under reduced pressure to leave a tan crystalline residue. Infrared analysis showed the presence of the desired diene with some unchanged starting material.

The total crude product, as a solution in benzene, was chromatographed on neutral alumina (100 g., activity III). Elution with hexane (cuts 1–6, 80 ml.) gave traces of a gum which was discarded. Elution with a 1:1 hexane-benzene mixture (cuts 6–13) returned some unchanged starting material, characterized by its infrared spectrum. Further elution with the same solvent pair (cuts 14–28) returned a crystalline solid, shown by its infrared spectrum to be 7,7,17,17-tetrafluoro-1,4-androstadiene-3-one. This product was recrystallized from methylene chloride-hexane to give colorless needles (0.688 g., first crop) melting at 243–245° C. The mother liquor yielded additional crystalline reaction product. A sample was sublimed for analyses.

*Analysis.*—Calc'd for $C_{19}H_{22}F_4O$: C, 66.74; H, 6.51; F, 22.2. Found: C, 66.99; H, 6.58; F, 22.06.

Ultraviolet:

$$\lambda_{max.}^{EtOH} \; 239m\mu \; (\epsilon=16,900) \; \text{and} \; 299m\mu \; (\epsilon=855)$$

The foregoing examples are to be considered as illustrative rather than limitative since any 7,7-difluoro steroid of the previously defined class can be prepared by the described process, supplemented when necessary by one or more of the already discussed additional transformations with which steroid chemists are familiar, many of which have been illustrated in detail. Additional examples of 7,7-difluoro steroids of the type contemplated by this invention include the following:

17β-butyryloxy-17α-ethynyl-7,7-difluoro-1-androstene-3-one
17α-ethynyl-7,7-difluoro-1,4-androstadiene-17β-ol-3-one
17α-acetoxy-7,7-difluoro-4-pregnene-3,20-dione
7,7,17,17-tetrafluoro-4-androstene-11β-ol-3-one
7,7-difluoro-17α,21-dihydroxy-4-pregnene-3,11,20-trione
17β-benzoyloxy-7,7-difluoroandrostane-3β-ol
7,7-difluoro-17β-propionoxy-1-androstene-3,11-dione
7,7-difluoro-17α-vinyl-1,4-androstadiene-17β-ol-3-one
7,7-difluoro-3-hexanoyloxypregnane-17α-ol
17α,20-diacetoxy-7,7-difluoropregnane-3-one
3β,17α-didecanoyloxy-7,7-difluoropregnane-20-one
7,7-difluoropregnane-3β,20-diol
7,7,17,17-tetrafluoro-1-androstene-3,11-dione
7,7,17,17-tetrafluoro-1,4-androstadiene-3,11-dione
7,7-difluoro-4-pregnene-3,20-dione
7,7,20,20-tetrafluoro-1-pregnene-3-one
7,7-difluoro-4-androstene-3,17-dione
17β-acetoxy-7,7-difluoro-4-androstene-3-one.

The androstanes of this invention and their unsaturated derivatives possess a marked effect toward androgenic activity. In some cases, for example, that of 7,7-difluorodihydrotestosterone, androgenic activity is present, and the response is different from that given by the non-fluorinated analog dihydrotestosterone in that the androgenic-myotrophic ratio is much higher, an advantageous property in the treatment of certain conditions where a selective androgenic hormone is desired. The androgenic activity of 17β-acetoxy-7,7-difluoro-1-androstene-3-one is of the order of that of the potent testosterone acetate.

In other cases, for example with 7,7,17,17-tetrafluoroandrostane-3-one and, even more markedly, its $\Delta^1$ derivative, antiandrogenic activity is present, as shown by the effective blocking of the hormonal effect of simultaneously administered testosterone propionate in the castrate male rat, while the anabolic action of the testosterone propionate is not significantly reduced. Similarly, the administration of 7,7,20,20-tetrafluoropregnane-3-one to young intact male rats showed that this compound is able to block the androgenic activity of endogenous androgen without blocking its growth promoting or anabolic effect. The use of these compounds as antiandrogens is not complicated by hormone-induced side effects. Anti-androgens are of considerable importance in certain clinical applications.

The varied activity of the compounds of this invention is further shown by the fact that administration of 17α-acetoxy-7,7-difluoro-1-pregnene-3,20-dione to estrogen-primed rabbits showed that the compound is a potent progestational hormone, as are also related 7,7-difluoro steroids of the pregnane series.

Furthermore, this compound is inactive as an inhibitor of ovulation. Compounds showing this separation of progestational and anti-ovulatory properties are unusual, and desirable in many clinical applications of progestogens.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound having the structural formula

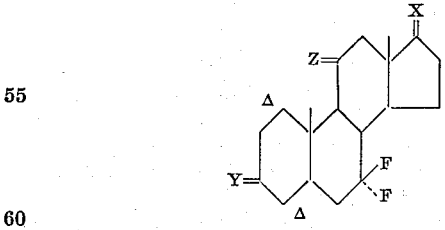

wherein X represents a member selected from the class consisting of (—$R^1$, —$R^2$), (=O), and (—F, —F); Z represents a member selected from the class consisting of (—H, H), (—H, —OH), and (=O); Y represents a member selected from the class consisting of (—H, —OH), (—H, OAcyl), and (=O); $R^1$ represents a group selected from the class consisting of H, OH, and OAcyl; $R^2$ represents a group selected from the class consisting of H, —C≡CH, —CH=$CH_2$, —$CF_2CH_3$, —$COCH_3$, —$COCH_2OH$, —$COCH_2OAcyl$, —$CH(CH_3)OH$ and $CH(CH_3)OAcyl$; Acyl represents a hydrocarbon carboxylic acyl group of from 1 through 10 carbon atoms; and Δ represents a bond of the class consisting of single and double bonds.

2. 7,7-difluoroandrostane-17β-ol-3-one.

3. 17β-acetoxy-7,7-difluoro-1-androstene-3-one.
4. 7,7,17,17-tetrafluoroandrostane-3-one.
5. 7,7,20,20-tetrafluoropregnane-3-one.
6. 17α-acetoxy-7,7-difluoro-1-pregnene-3,20-dione.

References Cited by the Examiner

UNITED STATES PATENTS 3,163,661  12/1964  Tadanier et al. _____ 260—397
3,211,723  10/1965  Kagan et al. _____ 260—239.55

References Cited by the Applicant

3,219,673  11/1965  Boswell.

OTHER REFERENCES

Nakanishi et al., Chem. & Ind., 1960, 1136.
Shoppee et al., Jour. Chem. Soc., 1958, 1657, "Steroids and Walden Inversion."

ELBERT L. ROBERTS, *Acting Primary Examiner.*